United States Patent [19]

Tychon et al.

[11] Patent Number: 5,142,632
[45] Date of Patent: Aug. 25, 1992

[54] CONTROL UNIT FOR PROCESSING INSTRUCTION USING CHAINED PROCESSING MODULES BY PROVIDING DOWNSTREAM FLOW OF OPERATIVE COMMANDS AND UPSTREAM VALIDATION INFORMATION

[75] Inventors: Philippe Tychon, Paris; Bénédicte Cherbonnel, Charenton, both of France

[73] Assignee: U.S. Philips Corporation, New York, N.Y.

[21] Appl. No.: 349,730

[22] Filed: May 10, 1989

[30] Foreign Application Priority Data

May 11, 1988 [FR] France .................. 88 06364

[51] Int. Cl.⁵ ................. G06F 15/80; G06F 13/38
[52] U.S. Cl. ................................. 395/375; 364/229;
364/230.5; 364/232.8; 364/271.2; 364/927.8;
364/931.48; 364/931.43; 364/940.3;
364/940.91; 364/937; 364/942.05; 364/950.3;
364/DIG. 1; 395/800
[58] Field of Search ... 364/200 MS File, 900 MS File;
395/375

[56] References Cited

U.S. PATENT DOCUMENTS

| | | | |
|---|---|---|---|
| 3,716,843 | 2/1973 | Schmitt et al. | 340/172.5 |
| 4,467,409 | 8/1984 | Potash et al. | 364/200 |
| 4,760,525 | 7/1988 | Webb | 364/200 |
| 4,868,739 | 9/1989 | Ngai et al. | 364/200 |
| 4,935,866 | 7/1990 | Sauvajol et al. | 364/200 |

Primary Examiner—Thomas C. Lee
Assistant Examiner—Ken S. Kim

[57] ABSTRACT

A control unit for processing modules of an integrated circuit for data processing includes at least one control module which is formed by a control operator and a gating means which exchanges input/output semaphores with upstream and downstream control modules and/or with processing modules. Each control operator, controlled by its gating means, receives microinstructions from an upstream control module and supplies microinstructions to one or more downstream control modules and/or microcommands to a downstream processing module. The control operator may comprise either a sequencer and a memory or a programmable logic array. The exchanges being controlled by the semaphores, each control module incorporates self-clocking sequencing. The control unit enables a modular design for the integrated circuit for data processing.

14 Claims, 8 Drawing Sheets

CONTROL UNIT FOR PROCESSING INSTRUCTION USING CHAINED PROCESSING MODULES BY PROVIDING DOWNSTREAM FLOW OF OPERATIVE COMMANDS AND UPSTREAM VALIDATION INFORMATION

BACKGROUND OF THE INVENTION

1. Field of the Invention

The invention relates to a control unit for processing modules of an integrated circuit for data processing which receives operative commands therefrom, which control unit is controlled by a clock and by an instruction generator which supplies instructions.

2. Description of the Prior Art

An integrated circuit of this kind is known from the document "A single chip, highly integrated, user programmable microcomputer", D. Stam, D. Budde and B. Morgan, Philadelphia 1977, IEEE International Solid State Circuit Conference (1977, p. 142).

Generally speaking, two parts can be distinguished in such an integrated circuit for data processing: the data processing unit and the control unit. The processing unit is formed by a plurality of operators: arithmetic operators, logic operators such as registers, combinatory logic operators (masking, extension, resetting to zero, shifting), input/output operators, etc. Each operator is defined by its function and by the time necessary for performing this function. The control unit decodes the instructions and applies the appropriate commands to the operators which then perform the operation stipulated by the instruction. The processing unit and the control unit are sequenced by a clock.

In order to define the sequencing in accordance with the present state of the art it is necessary to define the machine cycle time. This machine cycle time corresponds to the microcommand generated by the instruction for which the time required by the data to traverse the operators necessary for the execution of this microcommand is maximum. This machine cycle time is divided into a fixed number of phases, the duration of each phase amounting to a fixed number of half clock periods. Each phase validates the commands applied to a given operator by the control unit. The operators of a processing chain are thus activated in accordance with the successive phases of the machine cycle. However, such an integrated circuit for the digital processing of data has drawbacks as regards the exchange of control signals and data. This exchange is actually based on an overall sequencing of the commands. All sequencing signals for each of the operators are generated in a general fashion inside the processing unit. This multiplies the number of signals to be generated and increases the complexity of the interconnections.

The machine cycle and the phases defined to ensure an optimum performance of a processing unit also serve for the clocking of the control unit. This imposes some problems:

The phases which are useful for the processing unit must also be usable for the clocking of the control modules, necessitating different sequencing, and hence a possible degradation of the performance of the control unit.

The design of the control unit is closely linked to the design of the processing unit and a modification of the sequencing of the processing unit necessitates a modification of the sequencing of the control unit.

SUMMARY OF THE INVENTION

It is the object of the invention to mitigate these drawbacks in order to enable a higher degree of modularity of the integrated circuit, thus reducing the time required for its design. To this end, the invention utilizes modules whose concept already takes into account the function to be performed thereby as well the sequencing they require.

To achieve this, a control unit of the kind set forth in accordance with the invention is characterized in that it comprises at least one control module which is formed by a control operator and a gating means which receives an input semaphore and outputs at least one output semaphore and which, after reception of the input semaphore, supplies its control operator with signals adapted to its functional parameters, which gating means validates, at the end of the processing operation performed by its control operator, the supply of sequences of operative commands from the control operator to at least one subsequent processing module or of sequences of microinstructions to at least one subsequent control module under the control of output semaphores which are applied:

to said subsequent control module in order to ensure that its gating means prepares its control operator for the reception of said sequences of microinstructions and that each of them outputs sequences of output microinstructions to other control modules or sequences of operative commands to other processing modules, and deactivates the input semaphore at the end of the execution of each input microinstruction, or to said subsequent processing modle in order to ensure that it receives said sequences of operative commands and deactivates the input semaphore at the end of the execution of each operative command, the gating means also comprising:

for informing a preceding gating means, means for deactivating their input semaphore when all subsequent control operators and all subsequent processing modules have terminated the execution of their sequences of input microinstructions or their sequences of operative commands, and, for each microinstruction issued, means for receiving validated output semaphores whose logic state has been inverted by a subsequent gating means or by a subsequent processing module, the control modules also exchanging input/output execution messages from their operator which, in association with the exchange of semaphores by their gating means, ensures self-clocking sequencing for each control module which is also controlled by the clock, each processing module also being controlled by the same clock, the first control module receiving its instructions directly from the instruction generator and exchanging a semaphore therewith.

In order to mitigate the deficiencies of solutions known from the prior art, the invention provides a new protocol and sequencing mode. The use of a sequence of clock-phases generated by a sequencer outside the control unit is avoided. With each control operator there is associated a gating means which thus converts it into a self-clocking operator.

The gating means associated with a control operator controls the exchanges of microinstructions and messages with the upstream and downstream control modules or with the downstream processing modules by application of a protocol. Moreover, the gating means generates the actual timing signals for the control operator with which it is associated. Thus, each operator has local sequencing. Therefore, the invention is characterized in that the gating means comprises:

an input circuit for the input semaphore and an output validation circuit for each output semaphore, which circuits are validated by the control operator, a one-pulse generator which is activated either by activation of the input semaphore or by deactivation of the output semaphores, a phase generator which receives said pulse, supplies the necessary phases to the control operator and controls the output validation circuits and the input circuit.

The invention is also characterized in that the control operator comprises:

a sequencer which receives the input microinstructions, the input messages, and the information supplied by the memory, which sequencer determines, as a function of its inputs, the new address of the word to be read into the memory, and which generates, at the end of the execution of each input microinstruction, the end of execution signal and an output message, a memory which is clocked by the gating means, is addressed by the sequencer, supplies output microinstructions and encoded information for the sequencer, and supplies the gating means with output validation signals, a register for temporarily saving the output messages, at least one register for temporarily saving the output microinstructions, the sequencer, the memory and the registers being controlled by the gating means and supplying this gating means with the end-of-execution signal and the validation signals.

In a particular embodiment, the sequencer and the memory are replaced by a programmable logic array PLA. In that case the control operator comprises:

a register for temporarily saving the output messages, at least one register for temporarily saving the output microinstructions, a programmable logic array which receives the input microinstructions and the input messages and which supplies, for each input microinstruction, a sequence of output microinstructions and an output message, the programmable logic array and the registers being controlled by the gating means and supplying the gating means with the end of execution signal and the validation signals.

BRIEF DESCRIPTION OF THE DRAWING

The invention will be described in detail hereinafter, by way of example, with reference to the accompanying diagrammatic drawings; therein.

DETAILED DESCRIPTION OF THE PREFERRED EMBODIMENTS

Figure 1:
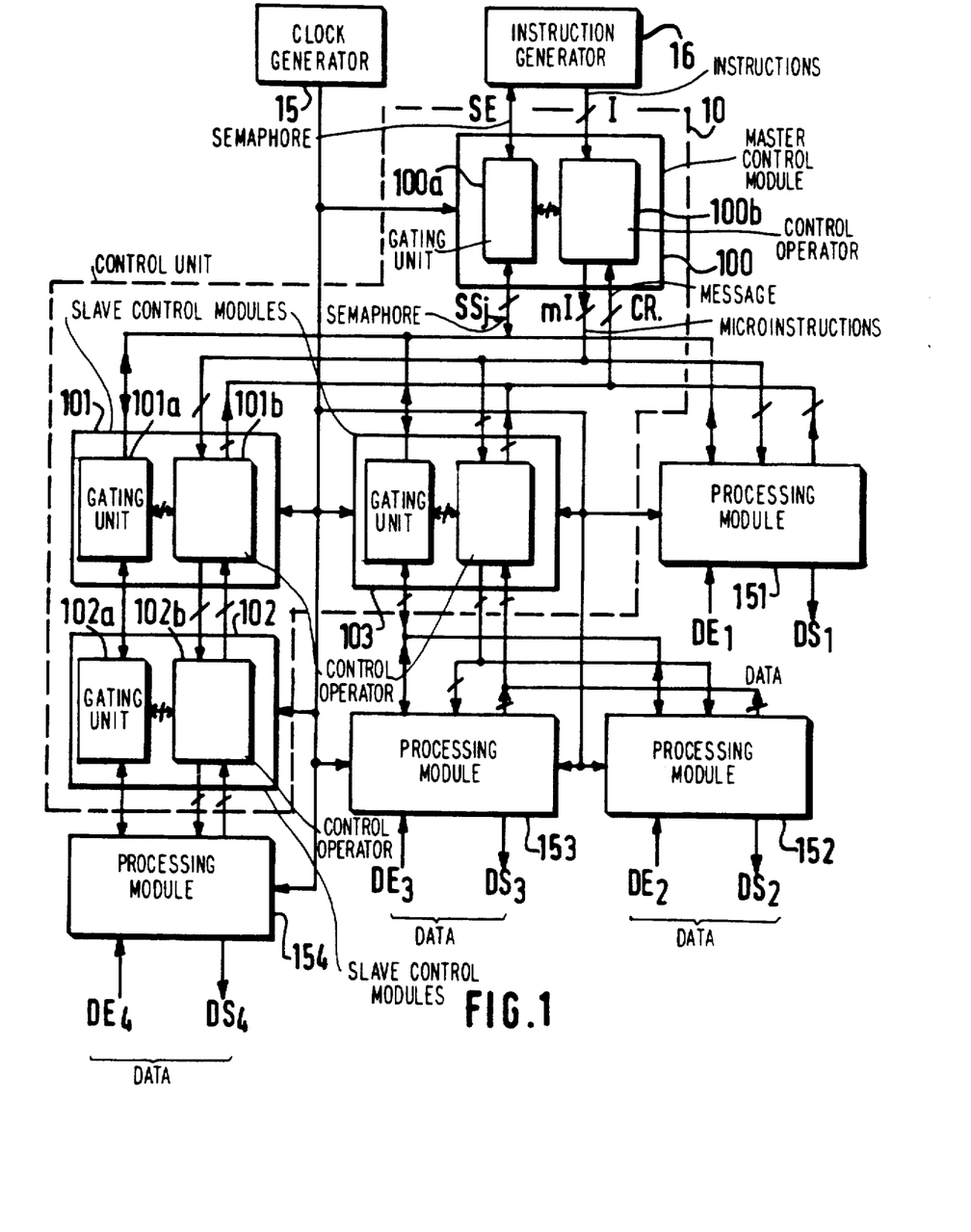
FIG. 1 shows a diagram of the control unit in accordance with the invention which operates with processing modules.

FIG. 1 shows a control unit 10 which comprises a master control module 100 which is connected to slave control modules such as the modules 101, 103 and to processing modules, for example the module 151. A slave control module can be referred to as an upstream module and as a downstream module. Among the slave control modules there are distinguished:

those which are connected directly to one or more processing modules; thus, in the present example the control module 103 is connected to two processing modules 152, 153.

those which are connected to another control module; thus, in the present example the control module 101 is connected to a control module 102 which itself is connected to a processing module 154.

They are referred as an upstream module or a downstream module in dependence of their relationship with whatever precedes or succeeds them. The module 101 is an downstream module with respect to the module 100, but an upstream module with respect to the module 102. Thus, in accordance with the invention there may be much more levels than shown in FIG. 1.

Thus, each control module, be it a master or a slave, may itself have several slave modules. At the end of the chain the final module is a processing module.

Each downstream module communicates with an upstream module by way of a semaphore, receives microinstructions therefrom if the downstream module is a control module or operative commands if it is a processing module, and supplies the upstream module with execution messages. Moreover, each upstream module communicates with several downstream modules by way of a semaphore for each module and supplies them with microinstructions if the downstream module is a control module or with operative commands if it is a processing module; it receives execution messages from all downstream modules.

All modules are controlled by the same clock signal which is supplied by the clock generator 15. The master module 10 is directly connected to the instruction generator 16 which supplies it with instructions I and with which it exchanges an input semaphore SE.

Each control module 100, 101, 102, 103 comprises a gating unit or means 100a, 101a, 102a, 103a and a control operator 100b, 101b, 102b, 103b, respectively. Each gating means receives and outputs semaphores. Each control operator receives and outputs microinstructions and messages.

Each processing module 151, 152, 153, 154 executes the microinstructions received and thus processes the input data DE1, DE2, DE3, DE4, respectively, and supplies output data DS1, DS2, DS3, DS4, respectively. The processing modules are formed, for example by an arithmetic and logic unit, memories, counters, registers, etc.

Figure 2:
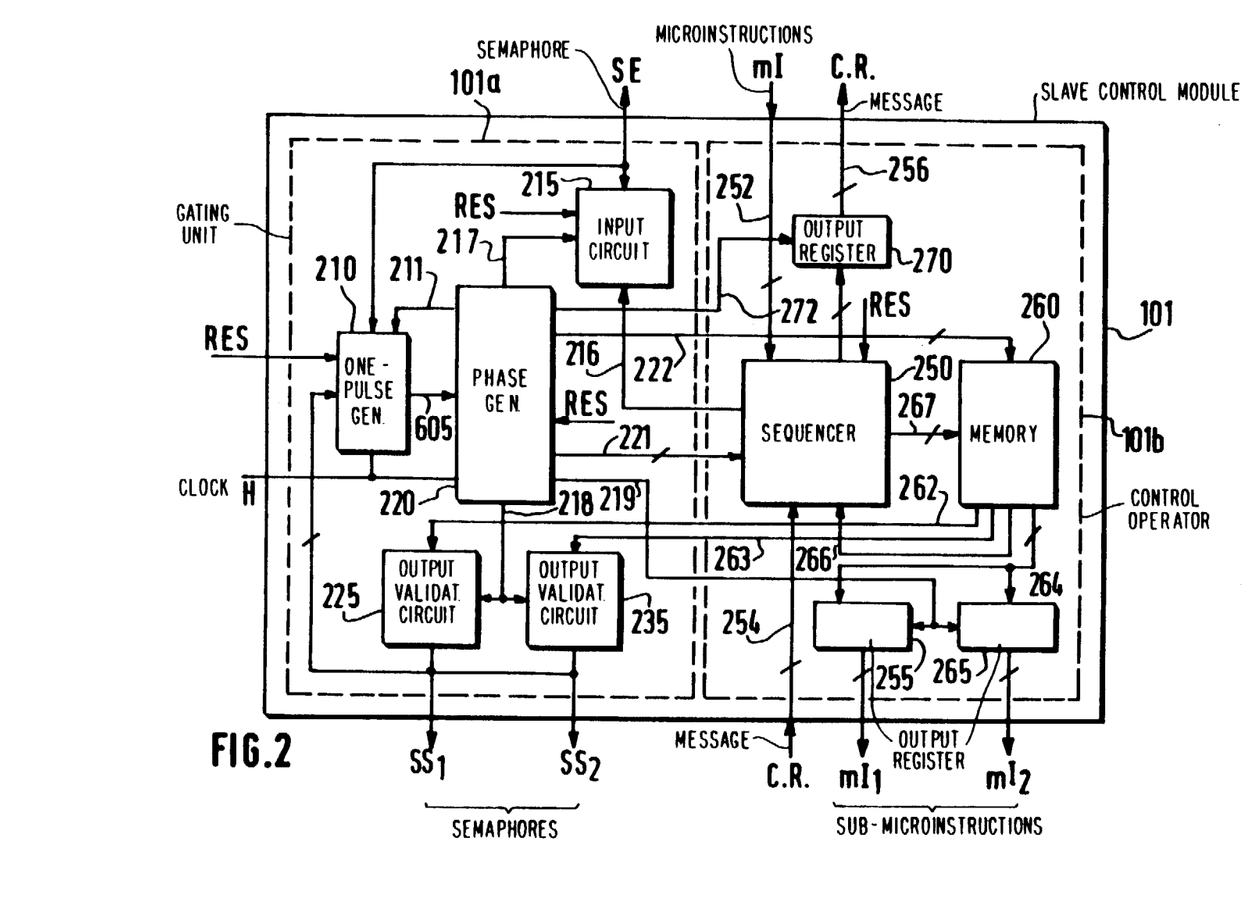
FIG. 2 shows a diagram of a control module.

FIG. 2 shows the diagram of the slave control module 101 with only two output semaphores SS1, SS2. It comprises a gating unit or means 101a and a control operator 101b.

The gating means comprises a one-pulse; generator 210 for a pulse signal 605 which is activated and deactivated by the input semaphore SE, by the output semaphores SS1 and SS2, and by a reactivation phase 211 which is supplied by the phase generator 220. It also receives the clock signal H. The pulse signal enters a phase generator 220 which supplies the phases to the control operator 101b. The phase generator 220 also acts, via an activation phase 218, on the output validation circuits 225, 235 which supply the output semaphores SS1, SS2, and on the input circuit 215 which receives the input semaphore SE via an input semaphor deactivation phase 217. From the control operator 101b the input circuit 215 receives a reset-to-zero signal for the input semaphore (connection 216). This signal is the end of execution signal.

From the control operator 101b each of the output validation circuits 225, 235 receives an output semaphore validation signal 262, 263. When the control module 101 is connected to several downstream control modules or processing modules, each signal enables a decision whether the module or modules connected must be activated.

The one-pulse generator, the phase generator and the input circuit all receive the signal RES which enables initialization of the circuit.

The control operator 101b, comprises:

a sequencer 250 a) which receives
   input microinstructions mI (bus 252) from an upstream control module
   input messages (bus 254) from a downstream control module or a processing module
   encoded information from the memory (bus 262) enabling calculation of the new address
   the circuit initialization signal RES b) and which supplies
   an output message (bus 256) in the direction of an upstream control module, via an output register 270 which is controlled by the phase generator 220 of the gating means 101a (output validation phase 272 of the messages)
   the address for the memory (bus 267)

a memory 260 which supplies
   the output microinstructions mI$_1$, mI$_2$, stored therein, in the direction of a downstream control module or a processing module, via output registers 255, 265 which are controlled by the phase generator 220 of the gating unit 101a via a validation phase 219.
   encoded information which is applied to the sequencer (bus 266) and which enables calculation of the new address.

The memory 260 is controlled by the sequencer 250 and by the phase generator 220 of the gating means 101a, via a clocking phase bus 222. The memory 260 itself controls the output validation circuits 225, 235 of the gating means (validation signals 262, 263) and supplies the sequencer 250, via a bus 266, with encoded information which enables calculation of the new address.

The sequencer is controlled by the phase generator 220 of the gating means 101a, via the clocking phase bus 221. The phase generator controls the output microinstruction registers (phase 219) and the output message register 270 (phase 272).

On the basis of the microinstructions mI received by the control operator 101b, the latter supplies the microinstructions mI$_1$, mI$_2$ which form sub-microinstructions of the microinstructions mI received. Each control module thus supplies a sub-set of microinstructions, relating to the microinstructions received on the input and to the module which is connected downstream therefrom.

Figure 3A:
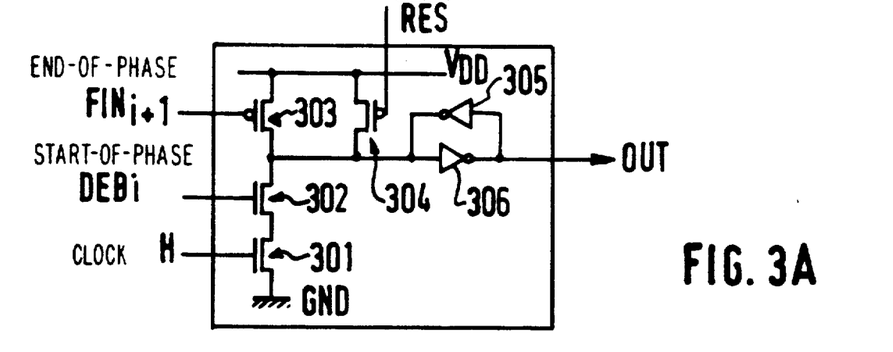
FIGS. 3A and 3B, 4A and 4B, 5A and 5B show three schematic representations and respective three time diagrams of functional blocks of the phase generator for generating phases of predetermined duration and predetermined position in time.
Figure 3B:
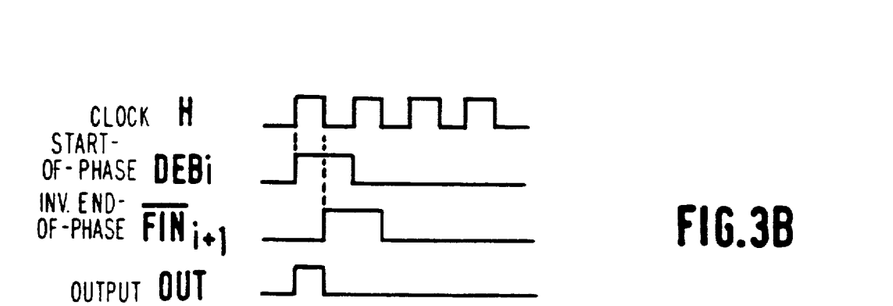

FIG. 3A shows a diagram illustrating an embodiment of an element of the phase generator 220 for delivering phases which have a predetermined duration and position in time. This duration is equal to one half clock period. A p-type MOS transistor 303 is connected in series with two n-type MOS transistors 301, 302, all three transistors being connected in series between a power supply voltage $V_{DD}$ and ground GND. Their gates receive the end-of-phase signal FIN$_{i+1}$, the start-of-phase signal DEB$_i$ and the clock signal H, respectively. In order to ensure that an output pulse is supplied as the output phase OUT, corresponding to an active phase of clock signal H, it suffices to impose a duration of one clock period on the signals DEB$_i$ and FIN$_{i+1}$, to ensure that DEB$_i$ leads FIN$_{i+1}$ by one half clock period, and to start at a low to high transitions in the active phase of the clock signal H. The output phase OUT becomes high when the signals H and DEB$_i$ are high. As soon as the inverted signal FIN$_{i+1}$ is high, the output phase OUT becomes low (FIG. 3B). A further p-type transistor 304 enables resetting to zero. Two inverters 305, 306 enable latching of the levels.

Figure 4A:
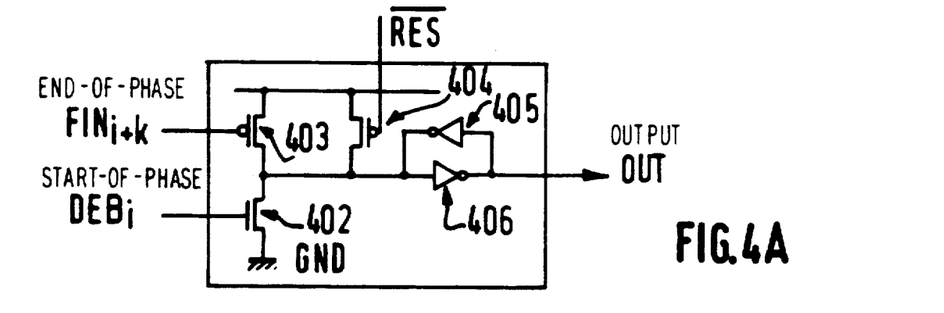
Figure 4B:
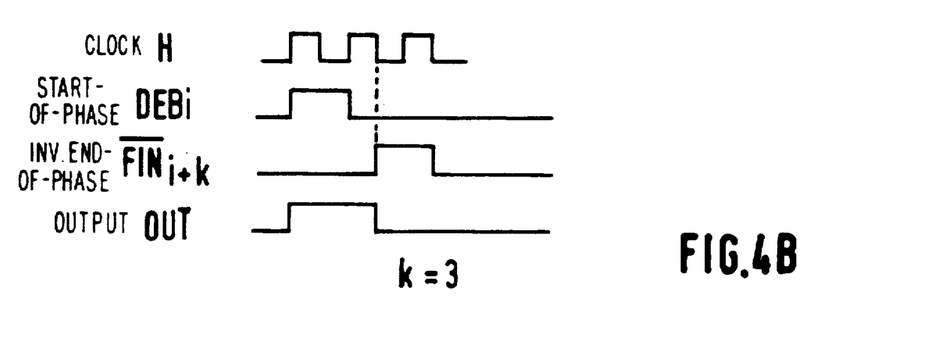

FIG. 4A shows a diagram which is analogous to that of FIG. 3A, although the transistor which receives the clock signal H has been omitted. According to this diagram phase can be supplied whose duration is strictly longer than one half clock period. The transistors 402, 403 and 404 and the inverters 405 and 406 operate in the same way as the corresponding elements of FIG. 3A. Thus, the pulse duration of phase OUT (FIG. 4B) is determined by the start-of-phase signal DEB$_i$ and the end-of-phase signal FIN$_{i+k}$. This duration amounts to k clock periods. It can be situated to begin at a predetermined instant in time which corresponds to a low to high transition in clock signal H or its inverse, whichever is the active phase H.

Figure 5A:
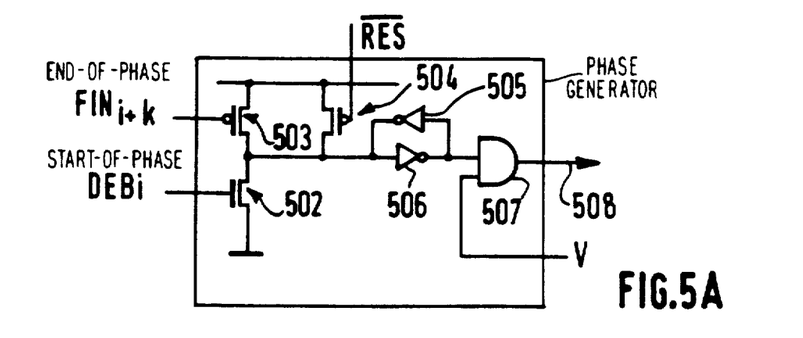
Figure 5B:
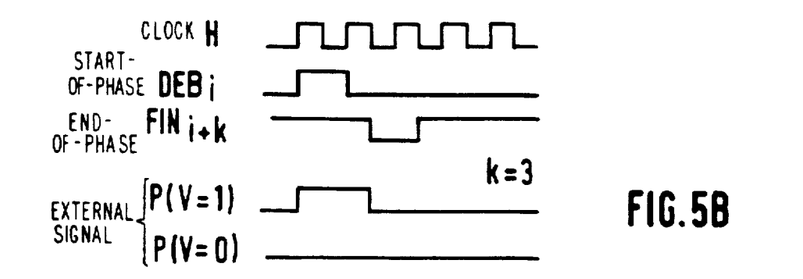

FIG. 5A shows a diagram which is analogous to that of FIG. 4A. The transistors 502, 503 and 504 and the inverters 505 and 506 operate in the same way as the corresponding elements in FIG. 4A. The output of the inverter 506 is connected to an AND gate 507 which also receives an external signal V. Thus, depending on the logic state of this signal V, the phase at output 508 will duplicate the logic state of this signal V during the pulse supplied by the inverter 506. The time diagram is given in FIG. 5B.

Thus, the logic state of an output phase supplied by phase generator 220 may be the same for the duration of this phase, as the logic state of a given applied signal V.

The diagrams of the FIGS. 3A, 4A and 5A are given by way of example and those skilled in the art can readily derive other diagrams therefrom in order to obtain pulses having a predetermined duration and position in time.

All functional blocks thus obtained must be organized in order to form a phase generator.

Figure 6:
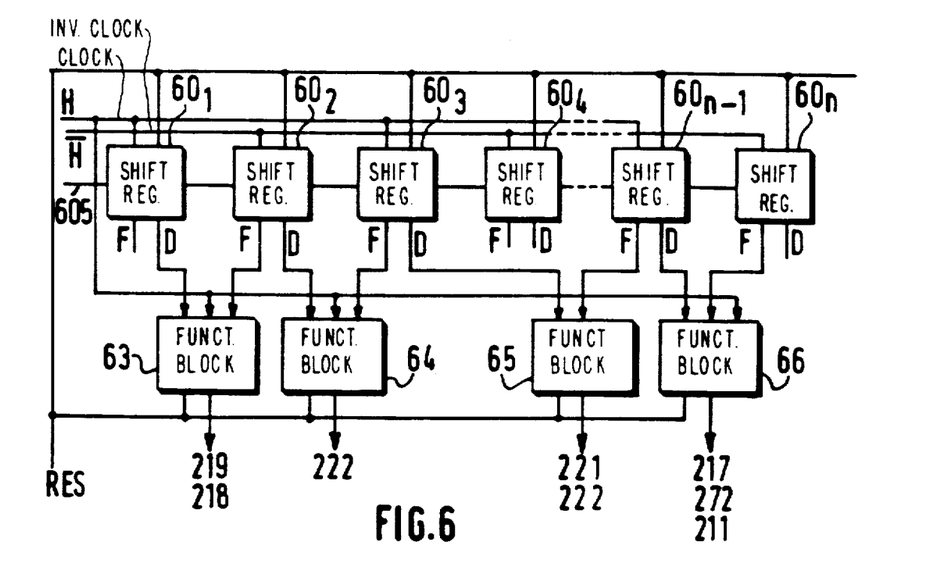
FIG. 6 shows a diagram illustrating the organization of the functional blocks in order to form a phase generator.

FIG. 6 shows a highly simplified example of combining these functional blocks in order to obtain a phase generator. Shift registers 60$_1$, 60$_2$, 60$_4$, . . ., 60$_{n-1}$, 60$_n$ supply one another with the pulse which is input into the first register $60_1$ via the connection 605. The registers are driven two-by-two by the same clock signal. Two consecutive registers have an inverted clock signal. Thus, each register supplies a signal FIN F and a signal DEB D which have been shifted in time with respect to the corresponding signals of the other registers. These signals constitute the various signals $DEB_i$, $FIN_{i+1}$ and $FIN_{i+k}$ which activate the functional blocks 63, 64, 65, 66 which are formed in conformity with, for example the diagrams shown in the FIGS. 3A, 4A and 5A.

The functional block 63 receives $DEB_1$ and $FIN_2$.

The functional block 64 receives $DEB_2$ and $FIN_3$.

The functional block 65 receives $DEB_3$ and $FIN_{n-1}$.

The functional block 66 receives $DEB_{n-1}$ and $FIN_n$.

Their output signals constitute the phases delivered by the phase generator.

Thus, referring to FIG. 2, in accordance with this example:

the functional block 63 supplies the activation phase 218 and the validation phase 219 for the output registers and semapheres, the functional block 64 supplies the precharge signal for the memory (one of the signals of the bus 222), the functional block 65 supplies one of the signals of the bus 221 which is applied to the sequencer in order to enable the operation thereof, the functional block 66 supplies the signals 217 for deactivating the input semaphore 272 for validating the message register 211 for reactivating the one-pulse generator.

Each phase generator is thus constructed on the basis of the phases required by the control operator it controls.

Thus, the phase generator supplies phases which are individually calibrated and positioned in time by means of a start signal and an end-of-phase signal in accordance with a multiple of half clock periods.

Figure 7:
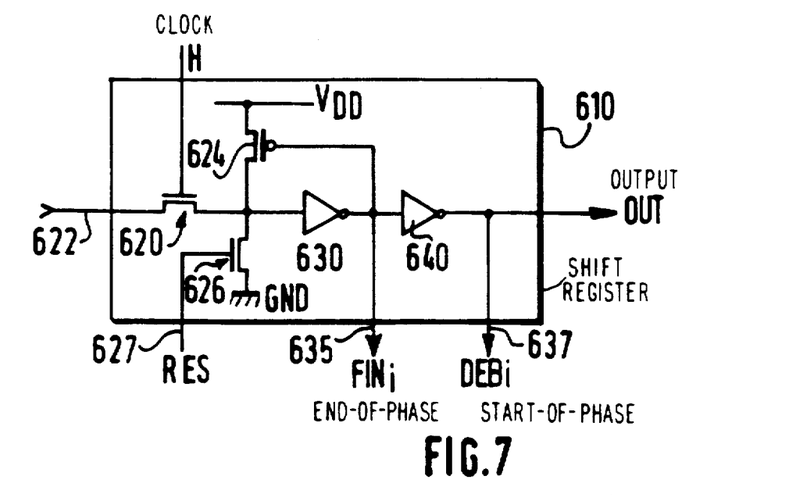
FIG. 7 shows a diagram of a shift register of the phase generator.

FIG. 7 shows an example of an embodiment of one of the shift registers $60_1$ to $60_n$ shown in FIG. 6. It comprises:

a MOS transistor 620 which is connected in a transfer gate arrangement and whose gate electrode is controlled by the clock signal H. The transistor is connected to the input signal 622 (for example, the pulse 605) and to the input of an inverter 630 whose output is connected to a further inverter 640.

The input of the inverter 630 is connected to the supply voltage $V_{DD}$ via a p-MOS transistor 624. The same input is connected to ground GND, via an n-type MOS transistor 626 whose gate electrode receives the reset-to-zero signal RES 627.

The gate electrode of the transistor 624 is connected to the common junction of the two inverters whereto there is connected a connection 635 for outputing the control signal $FIN_i$. The output of the inverter 640 supplies the signal $DEB_i$ 637 which is also the signal introduced into the next shift register.

Figure 8A:
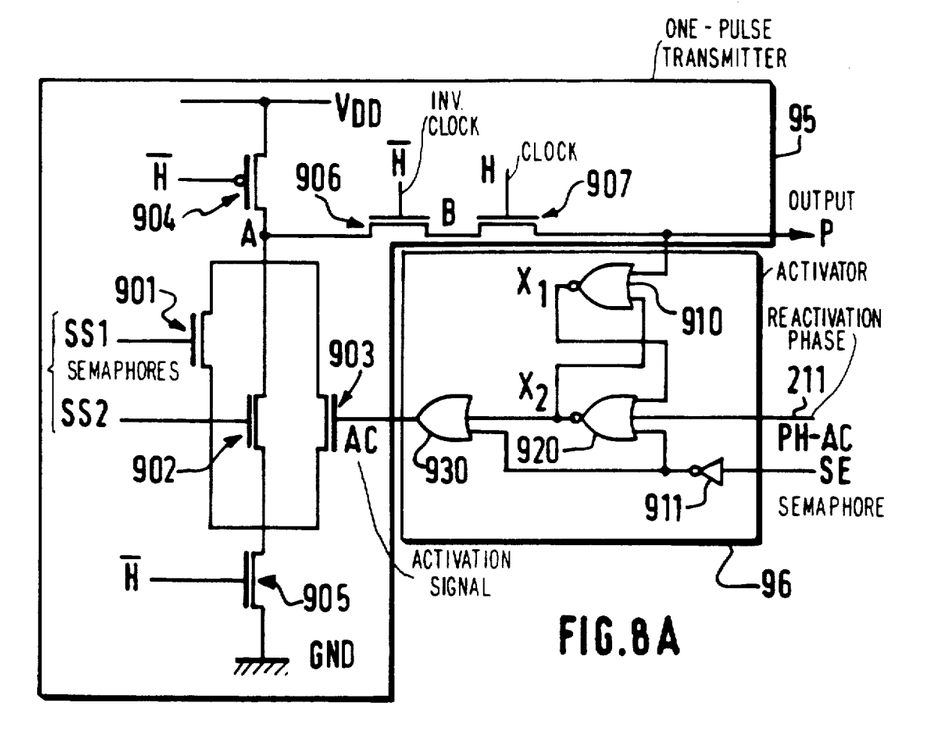
FIGS. 8A to 8E show a diagram of a one-pulse generator and the corresponding time diagrams.

FIG. 8A shows an example of an embodiment of a one-pulse generator. It comprises a one-pulse transmitter 95 and an activator 96. The transmitter comprises three n-type MOS transistors 901, 902, 903 which are connected in parallel. Their common drains (point A) are connected, to a supply voltage $V_{DD}$ via a p-type MOS transistor 904. Their common sources are connected to ground GND via an n-type MOS transistor 905.

The gate electrodes of the transistors 901 and 902 are connected to the output semaphores $SS_1$ and $SS_2$, respectively. The gate electrodes of the transistors 904 and 905 are connected to the inverted clock signal $\overline{H}$. To the point A there is connected an n-MOS transistor 906, in series with a further n-MOS transistor 907. Their gate electrodes are connected to the inverted clock signal and to the clock signal, respectively. They operate as a transfer gate. The output of the last transistor supplies the desired pulse P.

The activator 96 comprises a bistable multivibrator which consists of two NOR-gates 910, 920 which form a latch. The NOR-gate 910 receives on its input the output pulse P as well as the output signal $X_2$ of the gate 920. The gate 920 receives the input semaphore SE inverted by an inverter 911, the reactivation phase 211 PH-AC supplied by the phase generator 220 (FIG. 2), and the output signal $X_1$ of the gate 910.

An OR-gate 930 receives the output signal $X_2$ of the gate 920 and the inverted input semaphore SE, and supplies the activation signal AC which activates the gate electrode of the transistor 903. Thus, the semaphore SE can generate an output pulse by means of the clock signal only when the two output semaphores $SS_1$ and $SS_2$ are inactive.

The operation of the transmitter 95 and the activator 96 will be described in detail hereinafter.

The output P of the transmitter becomes 1 when AC is 0 and all output semaphores also are 0.

When a semaphore is activated (level 1) or when AC=1, P remains 0.

Figure 8B:
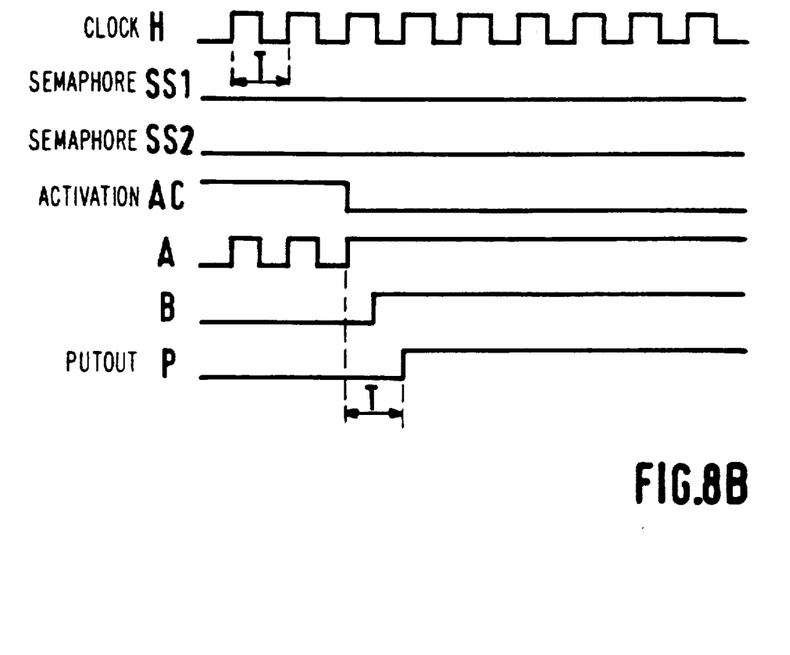

The delay between the instant at which one of the inputs changes over, having an effect on the output P, amounts to one clock period. The time diagram of FIG. 8B illustrates this situation:

$SS_1$ and $SS_2$ are 0

AC changes from 1 to 0 at the point A the level becomes 1 at the point B the level becomes 1 with a delay amounting to T/2 with respect to the point A the output P becomes 1 with a delay amounting to T with respect to the changing-over of the point A.

Figure 8C:
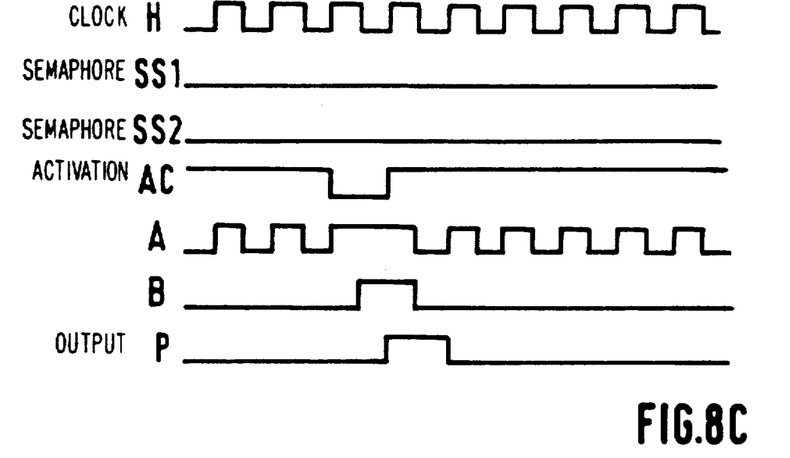

In order to generate a signal P having a duration of one clock period, its input AC must be set to 1 one clock period before the end of P (because of the delay of one period). This situation is shown in the diagram of FIG. 8C.

The general operation of the generator shown in FIG. 8 is as follows:

A—INITIALIZATION

The semaphores SE, $SS_1$ and $SS_2$ are inactive (level 0), so that it is not necessary to generate the pulse P. The activator 96 sets its output AC to 1.

B—The semaphore SE is activated, the activator resets its output AC to 0. The transmitter 95 sets its output P to 1. In order to generate a pulse having a duration of one period, the activator 96 sets its output AC to 1 subsequent to the changing of the state of the signal P on the input. The transmitter resets its output P to 0. This operation is shown in the diagram of FIG. 8D.

C—The pulse is applied to the phase generator 220 (FIG. 2) which generates phases:

this activates the output semaphores $SS_1$, $SS_2$ which become 1 and enables the reactivation of the one-pulse transmitter 95. When PH-AC becomes 1, the activator 96 resets its output AC to 0. This operation is illustrated by the diagram of FIG. 8D.

Figure 8D:
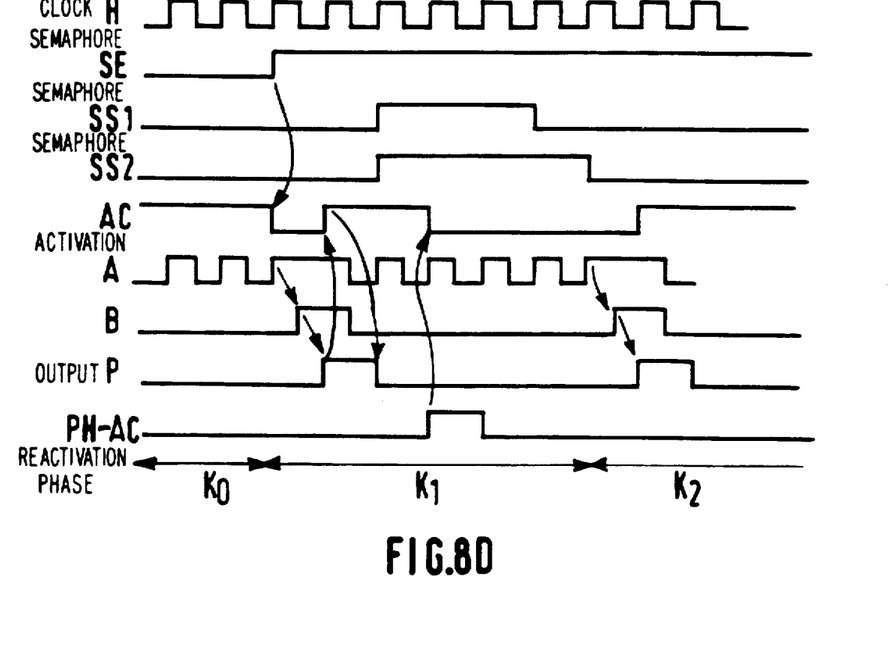

When the output semaphores are deactivated by other control modules, the semaphores $SS_1$, $SS_2$ become 0 again and, because AC already is 0, the generator 95 sets its output P to 1 for the duration of one clock period (FIG. 8D).

The generator of a given module is inactive during the period Ko. During the period K1 the generator is active and the microinstruction 1 is executed, and so on for the microinstruction 2 and further microinstructions in the course of the period K2 and further, periods.

Figure 8E:
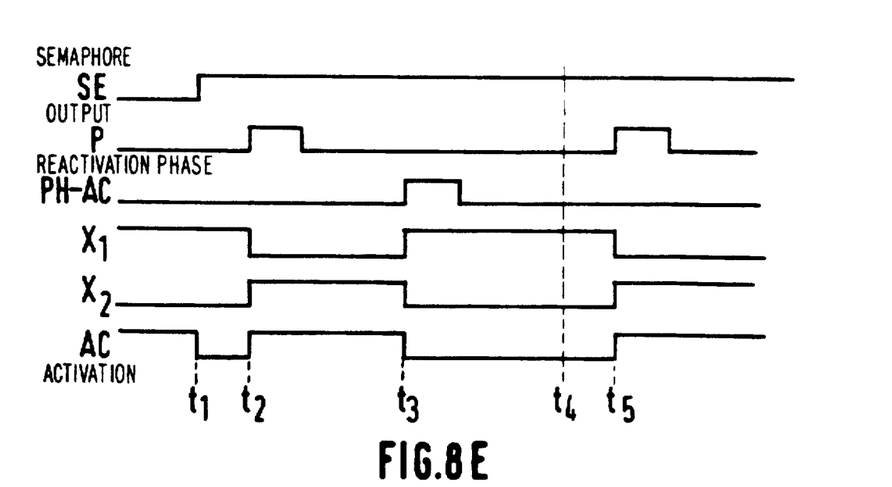

The time diagram of the activator 96 is shown in FIG. 8E. It operates as follows:

A—Upon initialization, SE, P and PH-AC are 0, and hence AC is 1. The transmitter 95 cannot dispatch a pulse.

B—When the input semaphore is activated (SE=1), the output AC becomes 0 and the transmitter 95 dispatches a pulse.

C—When P is activated, AC becomes 1 again and the transmitter 95 is deactivated.

D—When the phase generator 220 (FIG. 2) activates the signal PH-AC 211, the activator 96 resets its output AC to 0.

E—When the output semaphores $SS_1$, $SS_2$ are deactivated, the transmitter 95 outputs the pulse P after a delay amounting to one clock period, which pulse sets the output AC to 1 again, thus deactivating the transmitter 95.

At the instant $t_1$, the input semaphore SE is activated.
At the instant $t_2$, the pulse P is transmitted.
At the instant $t_3$, the signal PH-AC is generated by the phase generator 220.
At the instant $t_4$, the output semaphores are deactivated by another module.
At the instant $t_5$, a next pulse P is transmitted.

Figure 9A:
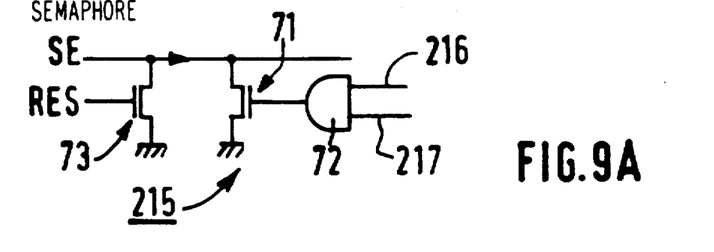
FIGS. 9A, 9B show the input and output circuits for activating/deactivating the semaphores.

FIG. 9A shows the circuit for deactivating the input semaphore 215 of the gating means shown in FIG. 2. The input semaphore SE is connected to the drain of an n-type MOS transistor 71 whose source is connected to ground. Its gate electrode receives the output signal of an AND-gate 72 which receives the reset-to-zero validation signal 216 supplied by the sequencer as well as the deactivation phase 217 supplied by the phase generator. The input semaphore SE is also connected to the drain of an n-type MOS transistor 73 whose gate electrode receives the initialization signal RES.

Figure 9B:
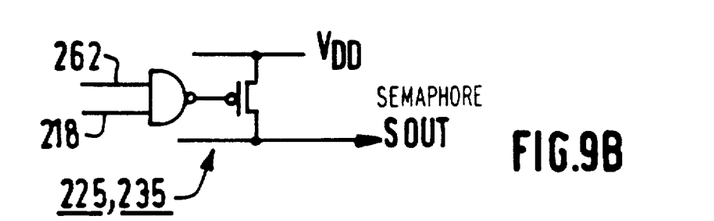

FIG. 9B shows a validation circuit 225, 235 for activating the output semaphores shown in FIG. 2. A NAND-gate receives the activation phase 218 supplied by the phase generator as well as the validation signal 262 supplied by the memory.

Operating protocol for three control modules:

I—When a control operator 100b applies a microinstruction $ml_1$ to a downstream control operator 101b, the gating means 100a at the same time activates its output semaphore $SS_1$ which is the input semaphore SE for the gating means 101a (FIGS. 1 and 2).

II—Via its one-pulse generator 210, the gating means 101a detects this activation and starts to generate the phases required by the operator 101b in order to execute a sequence of microinstructions. Each sequence is composed as follows:

instruction "start"
instruction 1
instruction 2 instructions n
instruction "end".

For each microinstruction the gating means 101a generates a sequence of phases and subsequently waits until all its output semaphores $SS_1$ and $SS_2$ have been deactivated before it processes the next microinstruction.

A sequence of microinstructions comprises three types of microinstruction, the execution of which necessitates the use of three consecutive control modules 100, 101, 102.

The following takes place in the module 101 (FIGS. 1 and 2).

A. Microinstruction "start"

Step 1

The output semaphores $SS_1$, $SS_2$ are not activated by the phase 218, because the commands 262, 264 which are supplied by the memory and which are applied to the output validation circuit 225, 235 are logic low.

Step 2

The sequencer 250 and the memory 260 (clocked by the phase bus 221, 222, respectively) operate in the usual manner and determine the first microinstruction to be applied to the next control operator 102b.

Step 3

The input semaphore SE is not deactivated by the phase 217 (the signal of the last microinstruction 216 is inactive).

B. Normal microinstruction (1 to n)

Step 1

A microinstruction determined during the execution of the preceding microinstruction is applied to the control operator 102b while validating, via the phase 219, one of the output registers 255, 265 of the control operator 101b and while activating, via the phase 218, the corresponding output semaphore $SS_1$, $SS_2$ which at the same time forms the input semaphore for the gating element 102a.

Step 2

This step is identical to the step 2 of the microinstructions "start".

Step 3

This step is identical to the step 3 of the microinstructions "start".

C. Microinstruction "end"

Step 1

This step is identical to the step 1 of the microinstructions "start".

Step 2

The sequencer of the operator 101b, clocked by the phase bus 221, generates the execution message CR 256.

Step 3

The message CR is applied to the control operator 100b by validation of the message register by the phase 272. The input semaphore of the gating means 101a is deactivated at the same time by the phase 217 which is validated by the end of execution signal 216 which is generated by the sequencer, thus informing the gating means 100a that the microinstruction is terminated. The control operator 100b at the same time receives the execution message and the sequencer of the operator 100b takes this into account for determining the next microinstruction.

III—When the gating means 100a detects the deactivation of its output semaphore, it generates a new pulse and the phases required for the new microinstruction.

Figure 10:
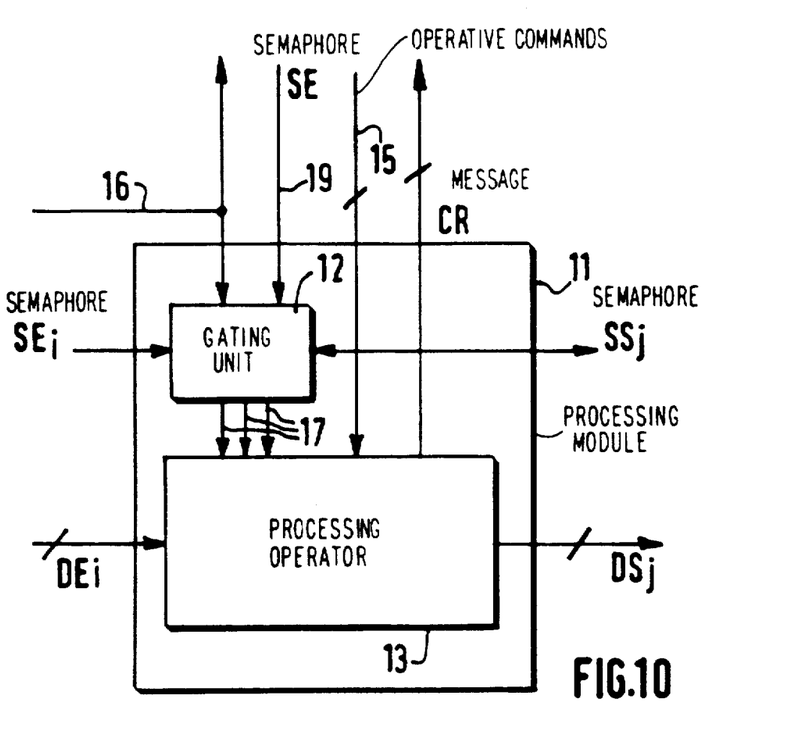
FIG. 10 shows a diagram of a processing module which is given by way of example and which can be connected to the control unit.

FIG. 10 shows, by way of example, the diagram of a processing module 11. It is also formed by a gating unit or means 12 and a processing operator 13. The gating means 12 receives an input semaphore SE from the upstream control module. A clock 16 controls the operation of the gating means 12. The operator 13 receives operative commands 15 from the upstream control module and applies execution messages CR thereto. These operative commands constitute the operating signals for performing, for example an addition, a shift, a multiplication, etc. in an arithmetic operator. The gating means 12 itself can receive input semaphores $SE_i$ from another processing module and can apply output semaphores $SS_j$ to another processing module. The gating means 12 supplies the operator 13 with the clocking signals 17 required thereby. The operator 13 receives input data $DE_i$ in the form of i multi-bit words. Moreover, it supplies output data $DS_j$ in the form of j multi-bit words.

For the design of the integrated circuit for digital processing the operators and the gating elements of the control modules, but also those of the processing modules. may form a library of predefined modules which can be assembled in order to form said integrated circuit. The gating means placed in the libary have an analogous design but at the instant of conception of the circuit given characteristics can be adapted to the operator with which the gating means is to be associated.

We claim:

1. A control unit for in response to instructions received from an instruction generator supplying operative commands to a series of data processing modules of an integrated circuit, which data processing modules are controlled by a clock, and which control unit comprises a series of control modules, controlled by said clock, including a first control module for receiving said instructions directly from the instruction generator and exchanging a semaphore therewith, each control module of said series of control modules being formed by a gating means and an associated control operator, which gating means receives an input semaphore and outputs at least one output semaphore and which, after reception of the input semaphore, supplies its associated control operator with signals adapted to functional parameters of said associated control operator, and which gating means validates, at the end of a control processing operation performed by its associated control operator, outputting of sequences of operative commands from said associated control operator to at least one subsequent processing module of said series of processing modules or of sequences of microinstructions to at least one subsequent control module in said series of control modules, said validating being under the control of said at least one output semaphore which is applied:

to said at least one subsequent control module in order to ensure that the gating means of said subsequent control module prepares its associated control operator for the reception of said sequences of microinstructions and that said subsequent control module also outputs a sequence of microinstructions to further subsequent control modules of said series of control modules or sequences of operative commands to further subsequent processing modules of said series of processing modules, and deactivates said at least one output semaphore at the end of execution of each microinstruction received by said subsequent control module, or to said at least one subsequent processing module in order to ensure that it receives said sequences of operative commands and deactivates said at least one output semaphore at the end of execution of each operative command, the gating means also comprising:

for informing a gating means of a preceding control module, means for deactivating said input semaphore when all subsequent control modules have terminated execution of their received sequences of microinstructions and all subsequent processing modules have terminated execution of their received sequences of operative commands, and, for each microinstruction supplied by said gating means, means for detecting whether said at least one output semaphore has been validated by having its logic state inverted by a subsequent gating means or by a subsequent processing module, the control modules also exchanging input/output execution messages among their respective control operators which, in association with an exchange of semaphores among their respective gating elements, ensures sequencing for each control module synchronously with the clock.

2. A control unit as claimed in claim 1, characterized in that the control operator of each control module comprises:

a sequencer which receives the sequence of microinstructions from a preceding control module, input messages, and information supplied by a memory, which sequencer determines, as a function of its inputs, a new address of a word to be read into said memory, and which generates, at the end of execution of each microconstruction received microinstruction an end-of-execution signal and an output message, a memory which is clocked by the gating means, is addressed by the sequencer, supplies output microinstructions and encoded information for the sequencer, and supplies the gating means with output validation signals, an output register for temporarily saving the output message, at least one output register for temporarily saving microinstructions to be outputted by said control module, the sequencer, the memory and the registers being controlled by the gating means of said control module and supplying this gating means with the end-of-execution signal and the validation signals.

3. A control unit as claimed in claim 1, wherein the control operator of each control module further comprises;

an output register for temporarily saving output messages, at least one output register for temporarily saving microinstructions to be outputted by said control module, a programmable logic array which receives the microinstructions from a preceding control module and input messages and which supplies, for each microinstruction received, a sequence of said microinstructions to be outputted and an output message, the programmable logic array and the registers being controlled by the gating means and supplying the gating means with an end-of-execution signal and validation signals.

4. A control unit as claimed in claim 1, wherein the gating means further comprises:

an input circuit for the input semaphore and an output validation circuit for each output semaphore, which circuits are validated by validation signals from the associated control operator, a one-pulse generator which is activated to generate a pulse either by activation of the input semaphore or by deactivation of the output semaphores, a phase generator which receives said pulse, supplies phases to the associated control operator, and controls the output validation circuit for each output semaphore and the input circuit.

5. A control unit as claimed in claim 4, wherein the phase generator supplies phases which are individually calibrated and positioned in time by means of a start signal and an end of phase signal, using a multiple of half clock periods.

6. A control unit as claimed in claim 5, wherein the logic state of a phase may be the same as the logic state of a given applied signal during this phase.

7. A control unit as claimed in claim 4, characterized in that the control operator of each control module comprises:

a sequencer which receives the sequence of microinstructions from a preceding control module, input messages, and information supplied by a memory, which sequencer determines, as a function of its inputs, a new address of a word to be read into said memory, and which generates, at the end of execution of each microconstruction received microinstruction an end-of-execution signal and an output message, a memory which is clocked by the gating means, is addressed by the sequencer, supplies output microinstructions and encoded information for the sequencer, and supplies the gating means with output validation signals, an output register for temporarily saving the output message, at least one output register for temporarily saving microinstructions to be outputted by said control module, the sequencer, the memory and the registers being controlled by the gating means of said control module and supplying this gating means with the end-of-execution signal and the validation signals.

8. A control unit as claimed in claim 7, wherein the phase generator controls the output registers for the microinstructions and the output register for the messages.

9. A control unit as claimed in claim 4, wherein the control operator of each control module further comprises;

an output register for temporarily saving output messages, at least one output register for temporarily saving microinstructions to be outputted by said control module, a programmable logic array which receives the microinstructions from a preceding control module and input messages and which supplies, for each microinstruction received, a sequence of said microinstructions to be outputted and an output message, the programmable logic array and the registers being controlled by the gating means and supplying the gating means with an end-of-execution signal and validation signals.

10. A control unit as claimed in claim 7, wherein the phase generator supplies phases which are individually calibrated and positioned in time by means of a start signal and an end of phase signal, using a multiple of half clock periods.

11. A control unit as claimed in claim 10, wherein the logic state of a phase may be the same as the logic state of a given applied signal during this phase.

12. A control unit as claimed in claim 9, wherein the phase generator controls the output registers for the microinstructions and the output register for the messages.

13. A control unit as claimed in claim 9, wherein the phase generator supplies phases which are individually calibrated and positioned in time by means of a start signal and an end of phase signal, using a multiple of half clock periods.

14. A control unit as claimed in claim 13, wherein the logic state of a phase may be the same as the logic state of a given applied signal during this phase.

* * * * *